United States Patent
Bobbitt et al.

(10) Patent No.: US 7,475,199 B1
(45) Date of Patent: Jan. 6, 2009

(54) SCALABLE NETWORK FILE SYSTEM

(75) Inventors: Jared E. Bobbitt, Seattle, WA (US);
Jiong (Justin) Chen, Seattle, WA (US);
Stephan A. Doll, Seattle, WA (US);
John W. Fawcett, Burien, WA (US);
Marc T. Friedman, Seattle, WA (US);
Robert C. Hickman, Duvall, WA (US);
Edward P. Johnson, Seattle, WA (US);
Ty Lam, Redmond, WA (US); Patrick
Wing Sang Lau, Issaquah, WA (US);
Joseph P. Mullally, Seattle, WA (US);
Robert J. Smith, Seattle, WA (US);
Jeffrey C. Tanner, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 581 days.

(21) Appl. No.: 09/694,071

(22) Filed: Oct. 19, 2000

(51) Int. Cl.
*G06F 12/00* (2006.01)
(52) U.S. Cl. ........................ 711/154; 711/161; 711/162; 707/204; 707/205
(58) Field of Classification Search ................. 711/114, 711/154, 161, 162; 707/204, 205
See application file for complete search history.

(56) References Cited

U.S. PATENT DOCUMENTS

| | | | |
|---|---|---|---|
| 6,199,146 B1 * | 3/2001 | Pence | 711/154 |
| 6,304,942 B1 * | 10/2001 | DeKoning | 711/114 |
| 6,381,619 B1 * | 4/2002 | Borowsky et al. | 707/204 |
| 2001/0000818 A1 * | 5/2001 | Nagasawa et al. | 711/112 |

* cited by examiner

*Primary Examiner*—Mano Padmanabhan
*Assistant Examiner*—Midys Rojas
(74) *Attorney, Agent, or Firm*—Van Pelt, Yi & James LLP

(57) ABSTRACT

An incrementally-scalable file system and method. The system architecture enables file systems to be scaled by adding resources, such as additional filers and/or file servers, without requiring that the system be taken offline or being known to client applications. The system also provides for load balancing file accesses by distributing files across the various file storage resources in the system, as dictated by the relative capacities of said storage resources. The system provides one or more "virtual" file system volumes in a manner that makes it appear to client applications that all of the file system's storage space resides on the virtual volume(s), while in reality the files may be stored on many more physical volumes on the filers and/or file servers in the system.

27 Claims, 7 Drawing Sheets

| FRAGMENT | TRANS | SOURCE | DESTINATION | CLIENT |
|---|---|---|---|---|
| 0 | 0 | 1 | - | - |
| 1 | 0 | 1 | - | - |
| ... | ... | ... | ... | ... |
| 1366 | 0 | 1 | - | - |
| 1367 | 0 | 1 | - | - |
| ... | ... | ... | ... | ... |
| 2048 | 0 | 2 | - | - |
| 2049 | 0 | 2 | - | - |
| ... | ... | ... | ... | ... |
| 3413 | 0 | 2 | - | - |
| 3414 | 0 | 2 | - | - |
| ... | ... | ... | ... | ... |
| 4K-2 | 0 | 2 | - | - |
| 4K-1 | 0 | 2 | - | - |

*FIG. 8A*

| FRAGMENT | TRANS | SOURCE | DESTINATION | CLIENT |
|---|---|---|---|---|
| 0 | 0 | 1 | - | - |
| 1 | 0 | 1 | - | - |
| ... | ... | ... | ... | ... |
| 1366 | 1 | 1 | 3 | IP MM/VLM |
| 1367 | 1 | 1 | 3 | IP MM/VLM |
| ... | ... | ... | ... | ... |
| 2048 | 1 | 1 | 3 | IP MM/VLM |
| 2049 | 0 | 2 | - | - |
| ... | ... | ... | ... | ... |
| 3413 | 0 | 2 | - | - |
| 3414 | 1 | 2 | 3 | IP MM/VLM |
| ... | ... | ... | ... | ... |
| 4K-2 | 1 | 2 | 3 | IP MM/VLM |
| 4K-1 | 1 | 2 | 3 | IP MM.VLM |

*FIG. 8B*

SCALABLE NETWORK FILE SYSTEM

BACKGROUND OF THE INVENTION

1. Field of the Invention

The present invention generally relates to network file systems and schemes, and more particularly, to a network file system that appears as a "virtual" file system to client applications that access the file system.

2. Background Information

Many of the biggest data storage problems being faced by companies today center around the need for data availability and scalability. Oftentimes, companies cannot predict with any degree of certainty how much data they are going to capture and how much storage they will need for that data. For instance, adding features such as click stream capture to an e-commerce web site may require a huge increase in storage capacity, requiring network administrators, developers, and other support personnel to implement significant changes in the system. In addition, new features are not the only drivers of increased storage requirements. Storage requirements are also exacerbated by the growth of existing features. For example, as a web site grows its user base, additional storage will be required to accommodate these new users.

One architectural approach being used to help address the issue of storage scalability is by designing modular storage systems. This facilitates the process of the addition or removal of a pre-determined amount of storage capacity without affecting existing applications. Some sites are referring to these pre-determined modules as "cells" of storage. Due to their inherent storage structure, these cells impose a minimum level of granularity that may lead to an inefficient use of resources.

Modular storage systems are used because of inherently unpredictable storage requirements. A successful web site can exceed forecast storage requirements literally overnight. Some companies even resort to building out surplus capacity, and only "turning on" those resources as they are needed. For example, some online stock trading companies are now sizing their infrastructure to handle peak loads that are 400 percent greater than normal. Storage problems such as these have spawned a new industry comprising companies that provide software, hardware, and services directed toward helping these companies handle the peak loads that result from their rapid growth and successful marketing programs.

Today, the most sophisticated sites must be architected with storage cells in order to support scalability. This requires an extensive amount of foresight, engineering and implementation to achieve. Other, less sophisticated sites are faced with the challenges of storage scalability without such architectural assistance. These sites generally must learn to scale their systems through trial and error, a risky and painful approach to configuring mission-critical resources.

The foregoing problems make it clear that better storage solutions are needed by the marketplace. Preferably, these data storage solutions need to be extremely flexible by supporting "true" storage on demand. Many vendors, both hardware and software, claim that their products support storage on demand, but all such solutions require administration and re-configuration of various components of the system. For example, storage may have to be re-partitioned across a set of storage devices when new resources are added to a system.

"True" storage on demand means that granular components of storage may be added to the system in real-time, without affecting the operation of applications or other components. In addition to allowing the seamless addition of increments of storage, it is just as important that the solution has the capability of effectively managing the storage. The solution should provide a simple, easy-to-deploy system that does not increase in management complexity as the storage capacity increases. There are no integrated solutions of this type that provide "true" storage on demand capabilities in today's marketplace.

SUMMARY OF THE INVENTION

The present invention comprises an incrementally scalable file system and method that addresses many of the foregoing limitations found in the prior art. The system architecture enables file systems to be scaled by adding resources, such as additional filers and/or file servers, without requiring that the system be taken offline. The system also provides for load balancing file accesses by distributing files across the various file storage resources in the system, as dictated by the relative capacities of said storage devices. The system provides one or more "virtual" file system volumes in a manner that makes it appear that all of the file system's storage space resides on the virtual volume(s), while in reality the files may be stored on many more physical volumes on a plurality of filers and/or file servers. This functionality is facilitated through the use of a software "virtualization" layer that intercepts file system requests and remaps the virtual volume location to the actual physical location of the files on the various filers and file servers in the system. This scheme is implemented through the use of two software components: 1) an "agent" software module that determines and knows how files are distributed throughout the system, and 2) a "shim" that is able to intercept file system requests. For Microsoft Windows clients, the shim is implemented as a file system filter. For Unix-variant clients, the shim is implemented as one or more NFS daemons. When new storage resources are added to the file system, files from existing storage devices are migrated to the new resources in a manner that makes the migration invisible to client applications, and load balancing is obtained.

Other features and advantages of the present invention will be apparent from the accompanying drawings and from the detailed description that follows below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8A–C show a fragment map before, during, and after a file migration operation, respectively;

DETAILED DESCRIPTION OF THE PREFERRED EMBODIMENTS

The present invention enables file systems to be easily scaled through the use of a "virtualized" file system scheme. The term "virtualized" refers to the invention's ability to enable the creation of one or more virtual file systems that may be hosted on one or more physical devices, but without applications having knowledge of the physical devices. In the following description, the term "Venus" will be used throughout to refer to an exemplary system implementation of the invention.

Definitions

Several terms used in the following description of the exemplary preferred embodiments of the invention and as used in the claims that follow thereafter will be defined. A filer, server or file server is a storage machine on which files can be stored and accessed. A volume is a fixed-size sequence of disk blocks on a file server. Each volume has a total size and free space. A share or export is the root directory of a directory tree that the server hosts and allows other remote machines to access. "Share" is a Windows term, while "export" is a UNIX term. A share is assigned to a single server volume, although there may be several shares sharing a volume. A share is associated with a directory on that volume. It also has a share name, which is the name that clients use to refer to the share's associated directory. A given share/export cannot span multiple volumes.

A Venus Virtual Volume (VVV) is a single directory hierarchy that spans one or more filers. It has an alphanumeric name, a master filer, and a set of partitions. To a client, a VVV has a local hostname (Venus), and root path (vvvname), and optional alternative names (drive letters under Windows, paths under UNIX). A partition is a slice of a VVV that resides in a particular share/export on a particular filer. A partition is associated with a particular VVV and has an index in that VVV, a filer index (filers associated with a VVV are numbered independently of other VVVs), and a root exported by the filer. Every partition resides on a single share/export and thus a single disk volume of a single filer.

A Venus client is any computer running applications that access files on a VVV. A Venus administrator is a computer running the Venus administration tool. It may or may not be a Venus client, and is installed separately from the Venus client software. A Venus administrator can communicate with remote clients via TCP/IP and servers via SNMP.

A Conventional Approach

Figure 1:
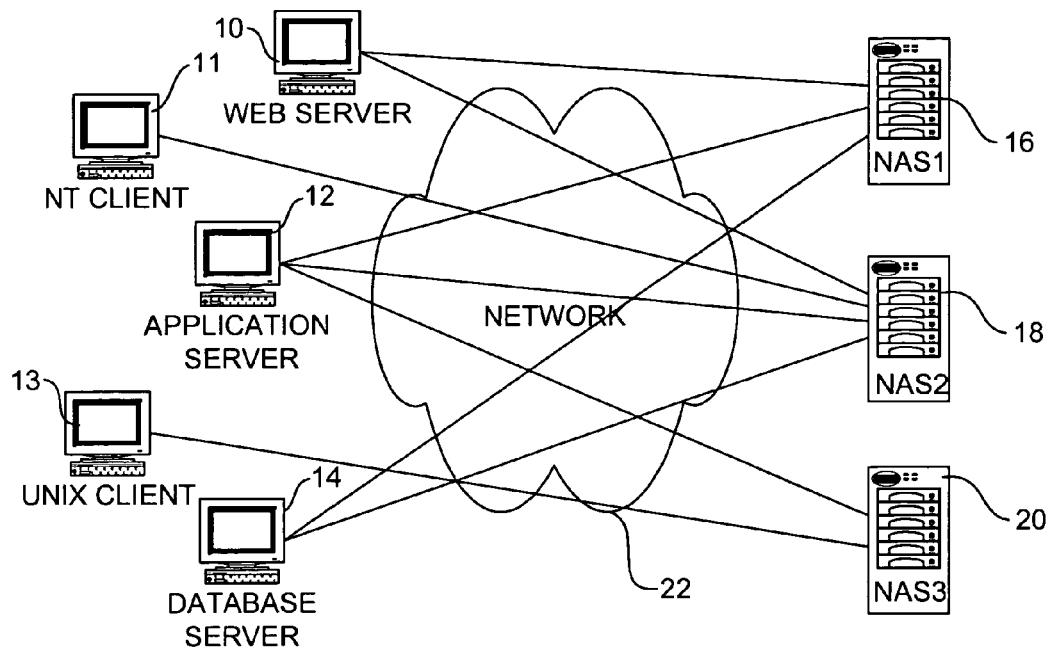
FIG. 1 is a schematic diagram depicting a conventional file system comprising a plurality of clients that access various NAS storage devices and servers over a computer network.

FIG. 1 shows a conventional network storage scheme that enables applications running on various client machines, including a web server 10, and NT client 11, an application server 12, a UNIX client 13, and a database server 14 to access files (i.e., store, retrieve, update, delete) stored on NAS (Network Attached Storage) filers 16, 18, and 20 via a network 22. In typical environments, network 22 will comprise a LAN (local area network) or WAN (wide area network). Under this configuration, each client application accesses a file or files served from one of NAS filers 16, 18, or 20 using one of two network file transfer protocols: CIFS (Common Internet File System) if the client is running under a Microsoft Windows operating system (OS), or NFS (Network File System) if the client is running under a UNIX-variant OS, such as Sun Solaris or Linux.

There are several problems associated with the conventional scheme. Each application and/or the OS must keep track of where files are stored, including the particular filer or server on which the files are stored, the logical volume, and the directory path. For instance, under a Windows OS, various configuration data are stored in the Windows registry, which often will include the location of application specific files. This makes it difficult to move files on the filers or between filers. Once all of the filers become or approach becoming full, it is necessary to add one or more additional filers to the storage scheme. While this adds additional capacity, it often overloads the new filer(s), since it is more common for applications to access more recent data and documents than older data or documents; the majority of newer data and documents will be stored on the new filer(s) since the previously existing filers will be full or almost full. In addition, configuration management of networks that connect many clients to one or more NAS devices can be a burdensome task under the conventional scheme.

System Architecture

The present invention addresses many of the limitations of the conventional scheme through the use of a flexible, scalable infrastructure for "virtualizing" and managing data resources. Architecturally, the scheme is implemented through a storage abstraction layer that sits between clients and data sources. The primary purpose of the layer is to virtualize the data sources from the perspective of the client. In other words, the invention makes it appear to each client application that it has access to one or more virtual data sources having a capacity equal to the combined capacities of the individual storage devices being virtualized.

Figure 2:
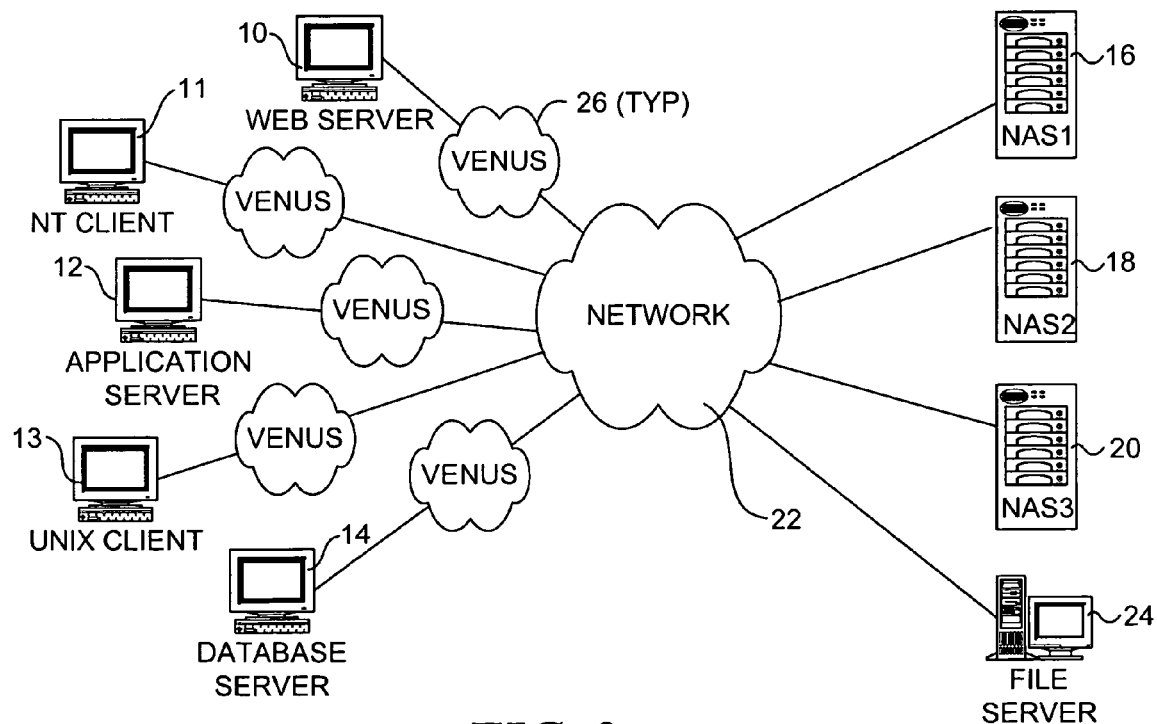
FIG. 2 is a schematic diagram depicting an exemplary implementation of the present invention.

With reference to FIG. 2, a storage abstraction layer 26 resides between each client and network 22. The scheme also provides for use of non-NAS file system devices, including a file server 24. As described in further detail below, storage abstraction layer 26 comprises several software components to provide each application with one or more Venus virtual volumes (VVVs), wherein each VVV may be hosted on any or all of the storage devices connected to the network, and the application need not know what device(s) or even what type(s) of device on which its data is stored.

Figure 3:
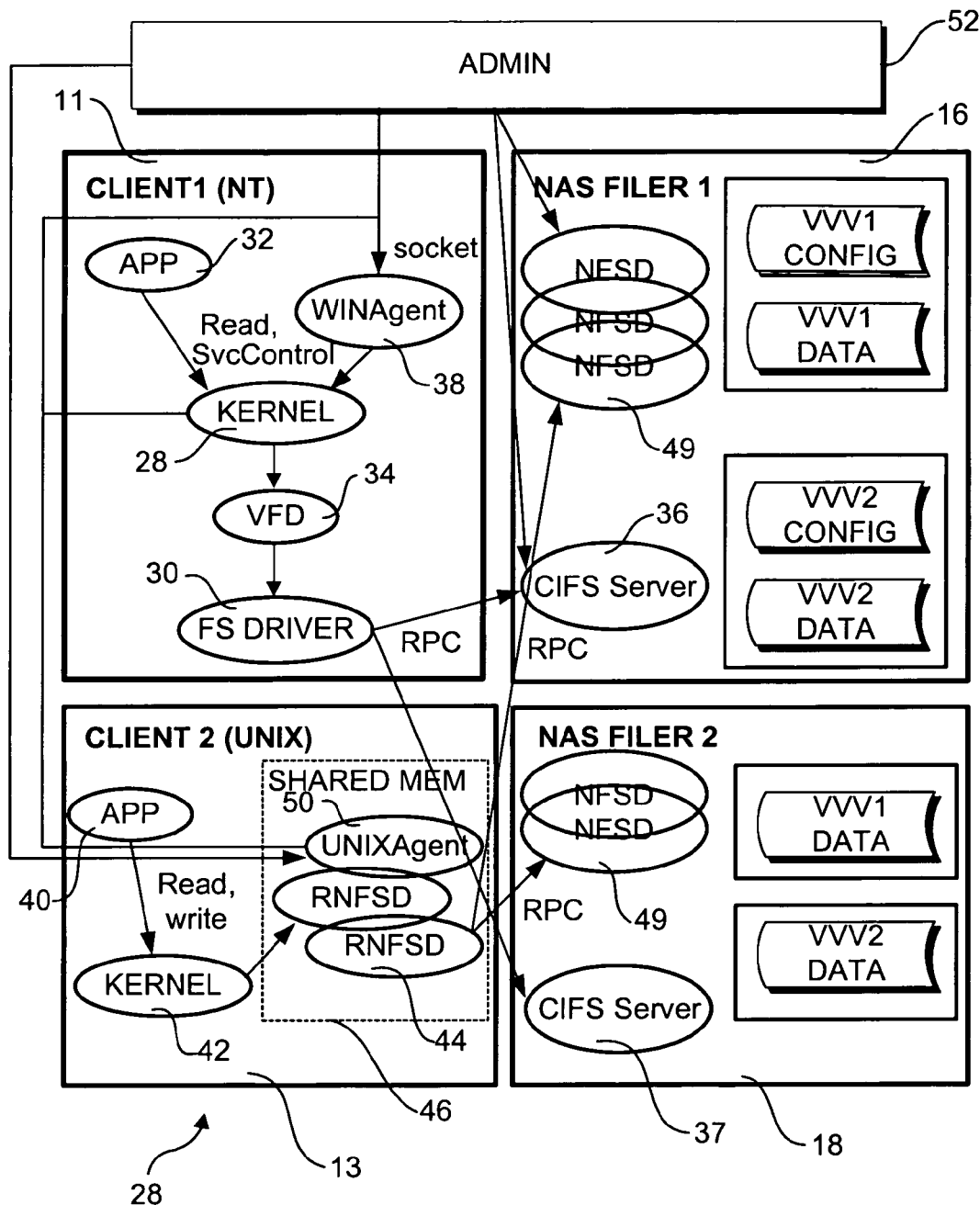
FIG. 3 is a schematic diagram illustrating an exemplary architecture corresponding to the present invention.

An exemplary configuration 28 of a heterogeneous operating environment for implementing the present invention is shown in FIG. 3. This configuration includes NT client 11, which is running the Windows 2000/NT OS, UNIX client 13, running under a UNIX OS such as Sun Solaris, and NAS filers 16 and 18 on which multiple volumes of files are stored. As discussed above, Windows OS environments use the CIFS network file system protocol. Under this scheme, file requests are issued to the OS kernel (i.e., kernel 28) and pass through a driver associated with a given remote volume. Venus interposes a filter driver between the kernel and whatever file system driver is installed for that volume. A filter driver is a module in Windows 2000 or NT that runs as a service within the kernel. It is associated with some peripheral device, such that a file service request, for example CreateFile or SvcControl, on that device is routed to the filter driver. It is a 'filter' in the sense that drivers can be chained together.

In the Windows environment, an application 32 issues file system requests, such as a CreateFile or SvcControl request, to kernel 28. Under a normal operation, a Windows file system request is processed by a direct communication between kernel 28 and a file system driver 30. However, as discussed above, the present invention further provides a filter driver, labeled Venus filter driver (VFD) 34, that is interposed between kernel 28 and file system driver 30 and intercepts file system requests as they are issued by kernel 28. VFD 34 performs several important functions corresponding to storage abstraction layer 26, including mapping file system requests from a virtual volume into physical volumes residing on NAS filers 16 and 18. The remapped file requests are then received by FS driver 30, which processes the file requests through use of a CIFS server, as depicted by CIFS servers 36 and 37, which respectively reside on NAS filers 16 and 18. The Windows 2000/NT implementation also includes a WinAgent 38, which is responsible for initializing the global state, shared memory, configuration changes, client-to-client communication, administration tool requests, statistics gathering, data migration, and distribution locks, further details of which are also explained below.

As discussed above, the invention provides a scheme that virtualizes a file system. One benefit of virtualizing a file system is that client applications and operating systems no longer have to keep track of where files are physically stored on the file system. In addition, the scheme allows files to be moved between various file system storage devices without affecting the operation of the applications, further details of which are described below.

Figure 4:
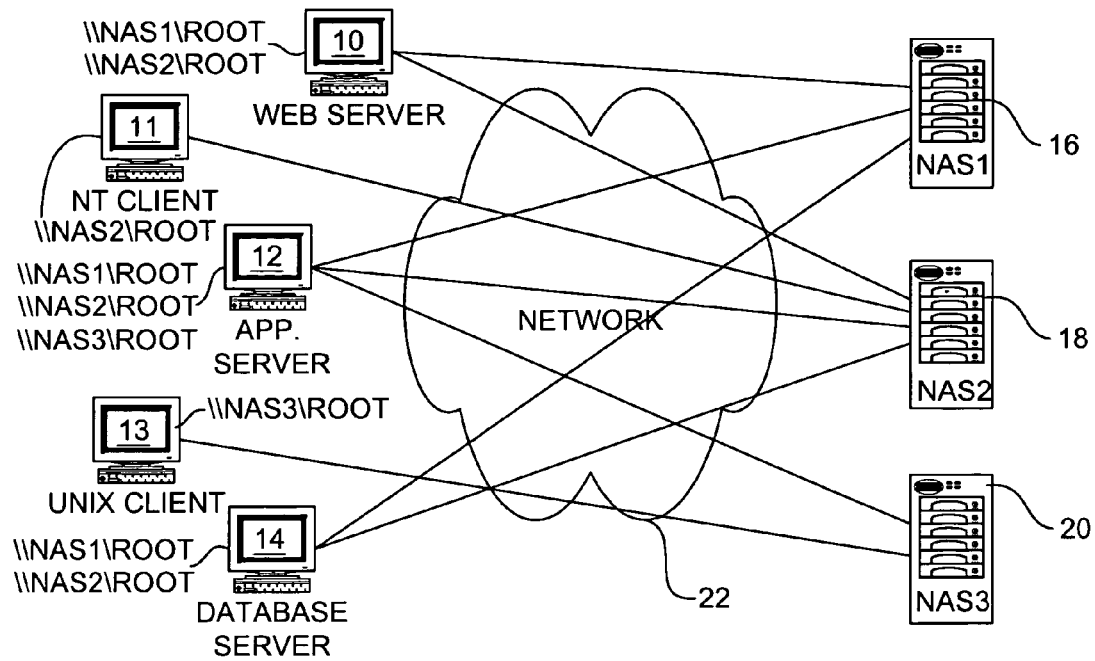
FIG. 4 is a schematic diagram corresponding to the conventional file system of FIG. 1 that depicts various root directory paths corresponding to NAS storage devices on which those root directories are stored.
Figure 5:
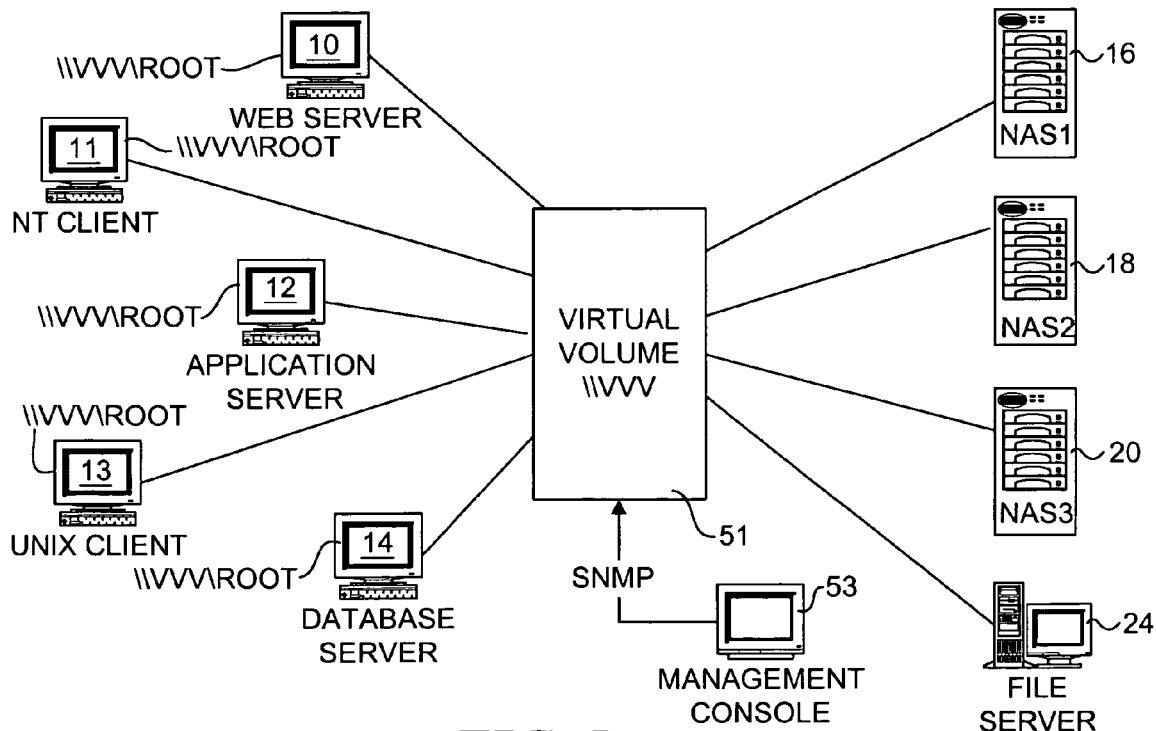
FIG. 5 is a schematic diagram that illustrates the virtual volume file system provided by the present invention.

A comparison of the conventional file system scheme shown in FIG. 4 and the scheme of the present invention shown in FIG. 5 illustrates some of the benefits the invention provides. In the conventional scheme, each client application and/or operating system must keep track of where it stores its files. For example, applications running on web server 10 store files on NAS filer 16 under a root directory of \\nas1\root and stores files on NAS filer 18 under a root directory of \\nas2\root. Similar root directories are shown adjacent to the other client machines in the Figure.

Under the invention's virtual volume scheme shown in FIG. 5, each client application stores files in a virtual volume 51 under the same root directory, an example of which is identified as "\\vvv\root" in the Figure. On the backend of the system, the virtual volume is mapped to physical volumes stored on the systems various filers and file servers, further details of which are discussed below. The scheme provides each client application with a file system interface that facilitates "fixed" virtual directory paths, while not requiring the applications to know the actual physical locations of the directories and files.

The components for an exemplary implementation of the invention under a UNIX environment are shown in the lower left-hand box of FIG. 3, which corresponds to UNIX client 13. File system access operations under UNIX implementations of the invention are similar to those under Windows environments, except the tasks are handled via a different set of components. Under UNIX implementations, Venus interposes the file system access process by mapping ("mounting") the NFS volumes in a VVV to a local modified Venus NFS daemon (RNFSD) running on the client. This daemon then creates requests to a remote NFS daemon on the NAS filer. RNFSD performs functions that are substantially similar to functions performed by VFD 34 in Windows environments.

Suppose an application 40 issues file system requests, such as ReadFile or WriteFile requests, to a UNIX kernel 42. UNIX kernel 42 then communicates with one of several RNFSDs 44 operating within a shared memory space 46 on UNIX client 13. RNFSDs 44 are enabled to access files via remote procedure calls (RPCs) to NFS daemons 48 and 49, respectively residing on NAS filers 16 and 18. The UNIX implementation also includes a UNIXAgent 50 that performs similar functions to WINAgent 38 discussed above.

Suppose that application 40 running on UNIX client 13 desires to access a file via NFS on NAS filer 18. Application 40 issues a read request, which is serviced by a kernel thread spawned by kernel 42. The kernel thread resolves the file system and file system type to discover that the file resides on NAS filer 18 and that NAS filer 18 implements an NFS file system. The kernel passes the request to the NFS client code, which typically resides in the kernel. The NFS protocol uses a set of NFS daemons on an NFS host machine (e.g., NFS daemons 49 on NAS filer 18) as (often single-threaded) RPC servers. An instance of RNFSD 44 makes an RPC request to NFS daemon 49 on NAS filer 18, which processes the request by performing a read file action.

A more detailed file transfer sequence corresponding to a UNIX environment is now presented. Consider a UNIX shell on UNIX client 13 executing command "cat/venus/vvv1/homes/marc/.cshrc." Application 40 will issue an open( ) command on the full path, receiving a handle for the file. Then it will execute a series of read( ) commands to get fixed-size sequential chunks of data. UNIX kernel 42 will receive the open( ) command and begin processing from the left of the path. It sees that /venus/vvv1 is the mount point for an NFS server residing on UNIX client 13 (actually RNFSD 44, but the kernel doesn't know the difference). UNIX kernel 42 has a handle for each such mount point (e.g., VH0). It sends "LOOKUP(VH0, "homes")" to RNFSD 44; RNFSD 44 will then route that request to the proper server. Note that VH0 is a "Venus handle" created by Venus, local to this client. RNFSD 44 knows which NAS filer hosts a file just by looking at the simple name—in this case let's say "homes" maps to NAS filer 16. RNFSD 44 has kept the handle FH0 (this is the "Filer handle" provided by NAS filer 16) for /venus/vvv1 from the call that mounted the volume in the first place, so it forwards the message "LOOKUP(FH0, "homes")." This returns a new NAS filer 16 handle for "homes", FH1. Venus creates another handle, VH1, and returns it to UNIX kernel 42. The kernel then issues "LOOKUP(VH1, "marc")" to RNFSD 44, etc., until eventually it has a handle VH3 for ".cshrc", which it returns to application 40. Note that this may result in calls to different remote servers, depending on the name. The read command from the application generates a read from the kernel to RNFSD 44, "READ(start+i,VH3, chunksize)." RNFSD 44 translates the handle and routes in the same manner.

The following sequence graphically depicts the foregoing process:

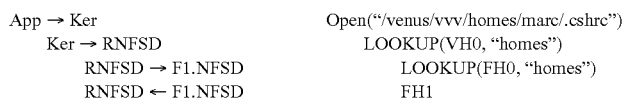

```
            Ker ← RNFSD                    VH1
            Ker → RNFSD                    LOOKUP(VH1, "marc")
                RNFSD → F2.NFSD                LOOKUP(FH1, "marc")
                RNFSD ← F2.NFSD                FH2
            Ker ← RNFSD                    VH2
            Ker → RNFSD                    LOOKUP(VH2, ".cshrc")
                RNFSD → F2.NFSD                LOOKUP(FH2, ".cshrc")
                RNFSD ← F2.NFSD                FH3
            Ker ← RNFSD                    VH3
        App ← Ker                          VH3
        App → Ker                          Read(0, VH3, SIZE)
            Ker → RNFSD                    Read(0, VH3, SIZE)
                RNFSD → F1.NFSD                Read(0, FH3, SIZE)
                RNFSD ← F1.NFSD                Chunk1
            Ker ← RNFSD                    Chunk1
        App ← Ker                          Chunk1
        ...
        App → Ker                          Read(N, VH3, SIZE)
            Ker → RNFSD                    Read(N, VH3, SIZE)
                RNFSD → F1.NFSD                Read(N, FH3, SIZE)
                RNFSD ← F1.NFSD                ChunkN
            Ker ← RNFSD                    ChunkN
        App ← Ker                          ChunkN
```

As discussed above, Venus virtualizes the storage space on various NAS devices and file servers to which clients are connected such that applications running on those clients can store data on any connected storage device without needing to know what actual volume or directory path on which the data are stored. The application only "sees" a small number of virtual volumes, typically only one or two. In order to provide this functionality, it is necessary to maintain configuration information that maps the directory paths on the virtual volumes into actual volumes and directory paths provided at the backend by the various NAS filers and file servers connected to the network. In addition, the configurations need to be initialized prior to becoming functional. This task is performed by an administration tool 52, which provides a user interface (UI) for configuring VVV volumes and the corresponding directory structures on filers and file servers in the system.

Administration tool 52 may be configured to run on a separate machine, such as a management console machine 53 shown in FIG. 5, or run on one of the client machines. Administration tool 52 communicates with the various client agents via the TCP/IP protocol. It communicates with the filers and servers via the Simple Network Management Protocol (SNMP). Further details of some of the functionality performed by Administration tool 52 are discussed below.

Partitioning

Figure 6:
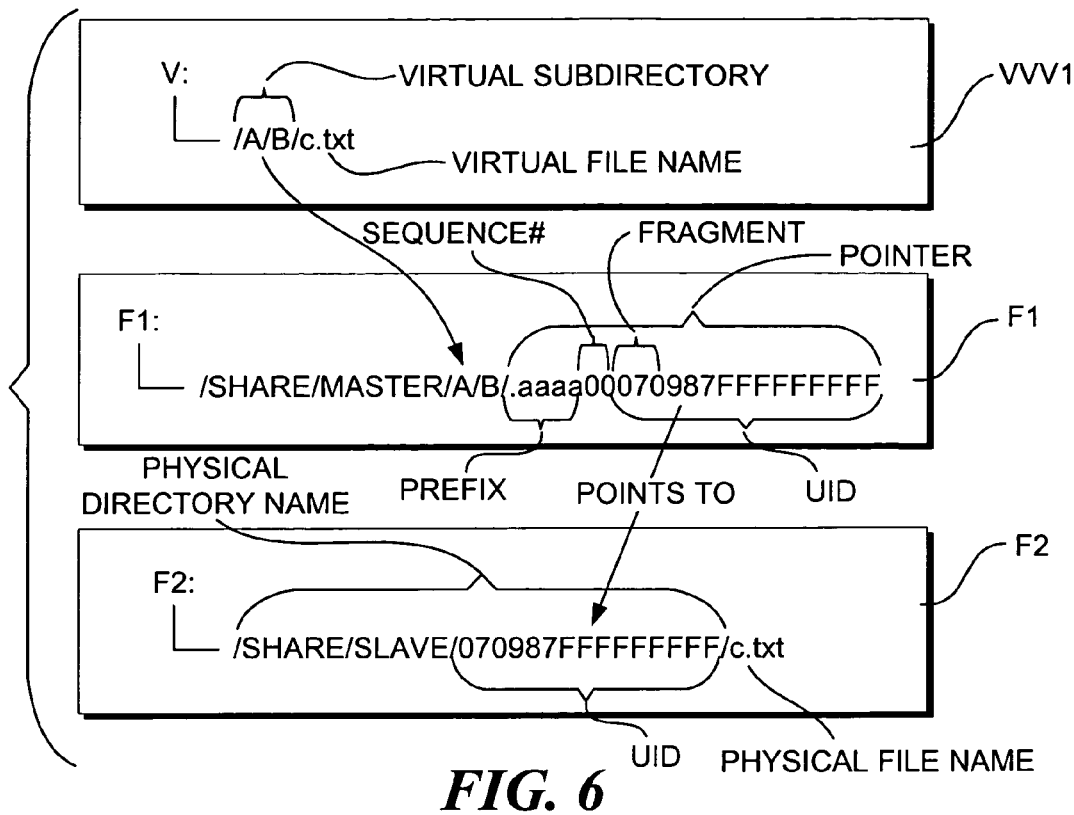
FIG. 6 shows an exemplary virtual volume subdirectory and file name and how such is mapped to a physical subdirectory and file on a storage device through use of an embedded pointer.

A Venus virtual volume (VVV) comprises a single directory tree with a single root and a single "space used" statistic. It may be stored on one or more filers and/or file servers. The VVV architecture is enabled through a partitioning scheme that organizes the VVV's directory tree and files on a set of independent file servers such that clients can readily map a directory or a file to an actual physical location. For illustration purposes, let /share be the local name of the directory exported/shared for use as the root of each Venus partition. There is one of these on each of three filers, named F1, F2, and F3. For consistency, the same name will be used for all roots. Further suppose that the VVV has two subdirectories and one file, /a/b/c.txt, as shown in FIG. 6.

It is desired to map each virtual file path to a physical file path on the storage device that the file is or will be actually stored on. This is facilitated by a scheme that enables physical directories to be looked up through the use of a master directory tree and embedded pointers maintained on one of the storage devices in the system.

For example, filer 1 (F1) includes a master directory comprising a tree structure having subdirectories corresponding to respective subdirectories in the VVV, which is rooted at /share/master. Under this scheme, files are stored in slave directories, which are located in a semi-flat directory, rather than in the master directory or its subdirectories. The master directories contain an embedded pointer that comprise an empty file whose name contains a unique identifier (UID) that is used to locate the physical subdirectory in which each file is stored. An associated slave directory, with the UID in its name, contains the files. The slave directories can be on any filer. There is a UID for each unique subdirectory in the VVV. For example, suppose UID (/a/b)=070987FFFFFFFFFFFFF, and the slave resides on filer 2 (F2). The paths for the master and slave become:

F1:/share/master/a/b/.aaaa00070987FFFFFFFFFFFFF

F2:/share/slave/070987FFFFFFFFFFFFF/c.txt

These directories are graphically depicted in FIG. 6. Every master directory has one pointer, and thusly one slave directory in which all files in such directory are kept together, with the exception of split directories which are detailed below. The master and slave partitions of the VVV are owned by the default Venus user and group, and do not permit non-Venus clients to execute certain functions.

Figure 7:
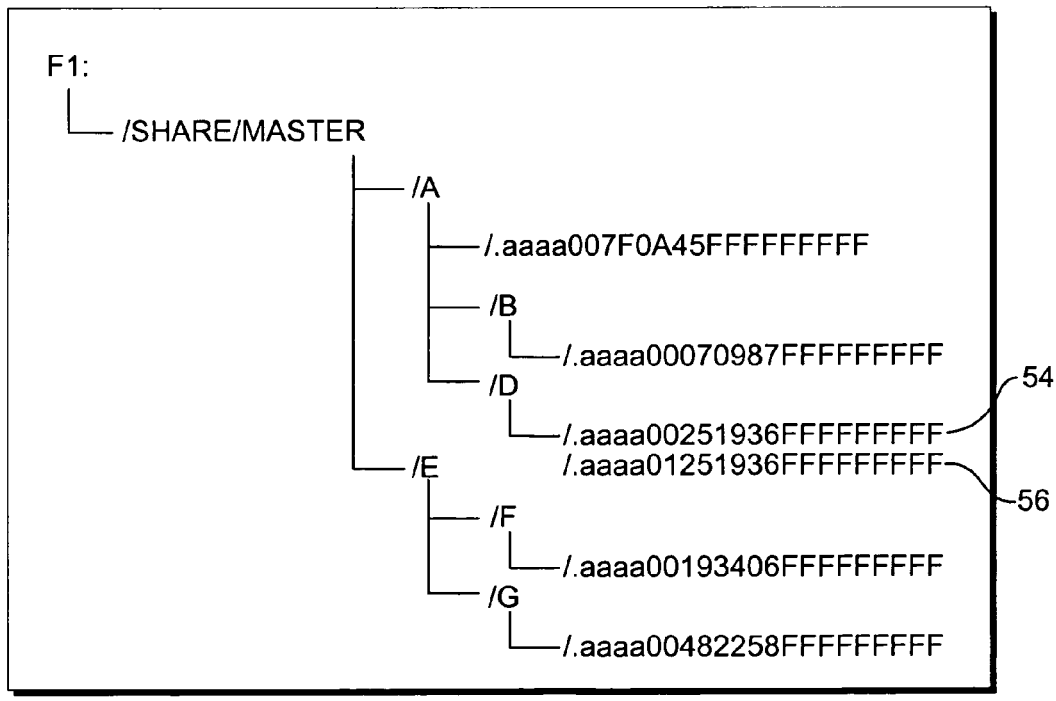
FIG. 7 shows another exemplary Master directory that includes a split-directory.

The pointer's file name consists of a prefix, a sequence number, and the UID. The prefix (".aaaa" in the example and as shown in FIG. 6) is fixed, and preferably should be chosen to appear early in an alphabetized list. Although letter characters are used in the example, various symbol characters may also be used. The sequence number comprises a 2-character hex value, and is used for split directories, as discussed below. The UID comprises a 16-Character hex value, padded to be of fixed-length, comprising a 3-character fragment portion, and a 13-character random number. All of the hex characters preferably are capitalized. A more complete master directory tree is shown in FIG. 7.

The directories are partitioned into fragments, preferably by using a hashing scheme that provides a relative distribution of directories among the various filers and file servers in a system. The basic idea is to partition all of the storage space on all of the filers and file servers so that the fragments, and thus files, are distributed as dictated by the relative capacities of said filers. A relative distribution takes into account the quantity of data, the frequency of access of that data, and both the storage and throughput capacities of each filer. Accordingly, partitioning at the directory level is used in the exemplary implementations described herein, although other types of partitioning schemes may also be used. In this manner, load balancing of the file system can be effectuated, as described in further detail below.

There are two situations that cause even-distribution problems. Systems with a few large files will defeat any file-based partitioning scheme, since the minimal granularity will be the (size of the) file itself. Although a block level I/O scheme could be used to solve problems with such large files, it is preferable to keep files intact, so this isn't a viable solution. Another more frequent problem occurs when dealing with a few large directories that have a large number of files. To counter this problem, the present invention provides a partitioning scheme for "splitting" directories when they become or already are too large. In general, split directories will be a rare exception; most directories will not be or need to be split.

A split directory has multiple UIDs, pointers, and slaves. Each UID is associated with a sequential index starting with zero (i.e., the sequence number). This index is stored in the pointer. The number of partitions, or fanout, for a split directory is some power of 2. Preferably, files in such directories are distributed among the split directories by using a 32-bit hash of their name, mod the fanout value. An example of a directory that has been split into two halves is shown in FIG. 7. Directory entries 54 and 56 have a common parent directory (/D) but have different sequence numbers and different UID values. As described below, files are moved to new directories from a split directory in a process known as "minimigration."

In accordance with the partitioning scheme of the invention, a slave can be found by using a two stage mapping: UID→Fragment→Partition. As discussed above, the fragment is specified by the first 3 characters of the UID. The fragment-to-partition mapping is stored in a shared array called the fragment map that is stored on at least one filer. Such a fragment map is described below with reference to FIGS. 8A–C. An in-memory copy of the fragment map is also stored by each of the WINAgents and UNIXAgents, and changes to the fragment map are propagated to these agents when such events occur.

The following example illustrates the creation of a new directory under NFS. The process will be initiated by calling NFS Create Directory(/a/b). The client will get a handle H(a) of "F1:/share/master/a" through a normal NFS directory creation process, and then call MKDIR(F1, H(a), "b"). The Venus driver will then create the UID, slave, master, and pointer, as follows.

A UID is chosen at random. The slave directory "F2:/share/slave/UID" is then created on filer F2. This requires finding the handle of "F2:/share/slave." The attributes of the slave are then set to standard slave attributes. The master directory "F1:/share/master/a/b" with attributes implied by the caller is next created on filer F1. A pointer "F1:/share/master/a/b/.aaaa00[UID] with Venus as its owner and all permissions granted is then created on filer F1.

Now an example of opening a file is presented. Opening a file is initiated by calling NFS Open File(/a/b/c.txt, permission=READ). This will return a handle H(b) to the client of "F1:/share/master/a/b" through a normal NFS open file process, and call LOOKUP(F1, H(b), "c.txt"). In generally, LOOKUP doesn't indicate the type, so it doesn't know whether it's looking for a directory or a file. The system would then look for "c.txt" in the master directory (passing through the LOOKUP command), which will produce a negative result, since "c.txt" is not a directory. As a result, "c.txt" is correctly assumed to be a file, and READDIR(F1, H(b)) is called to list the directory. The directory is searched for any pointers. If the filer guarantees ordering, this requires scanning only until the items searched exceed the prefix in alphabetical order. Otherwise, the entire master directory must be searched to verify whether the file exists or not.

The fanout is then counted, and the pointers are put in an array ordered by sequence number. Preferably, this array will be cached on clients, as described below. A hash function is performed comprising ("c.txt") mod fanout to determine which pointer to use. For that pointer p, the filer F(p) on which the file resides can be extracted from the fragment map, get the handle of F (p):/share/slave, and LOOKUP(F(p), H(F (p)/share/slave), "c.txt").

File Migration and Load Balancing

One of the most important aspects of the invention concerns the system's ability to load balance file usage. This is accomplished by maintaining the proper distribution of files on each filer and file server through the proper distribution of directories, as dictated by the relative capacities of each filer and file server. The invention also enables administrators to add additional storage devices (e.g., a new filer) on the fly, while simultaneously providing access to existing files. In order to provide proper load balancing, it is necessary move a portion of the files on the filers and servers that previously existed in the system to the new filer or server that has been added. This process is called "migration."

A migration comprises moving fragments from source to destination storage devices. In order to ensure the integrity of the data, this process requires locks on files such that files are only migrated to the destination filer when no clients are accessing such files.

Under general operations of the system, a client must have a token for a file or directory whenever it wants to read, write, create, delete, or change an attribute of the file or directory. A token is an expiring share lock. When the token is valid, it guarantees that there is a single instance of the file. Note there are instances during a migration in which a file may reside temporarily in two locations (on both the source and destination filer). A file cannot be migrated until any outstanding tokens have expired. Accordingly, only files that are not currently in use by a client may be migrated. The client keeps these tokens and makes sure that a token is valid for every file immediately before it is accessed. Tokens are issued on a per client basis, and are granted by a Venus Lock Manager (VLM) upon request. The invention's approach to migration and locking very much favors client operations over migration operations. If a client requests a token, it is always granted; a client will never be denied a token request. This approach ensures that migration is completely invisible to clients.

Figure 8C:
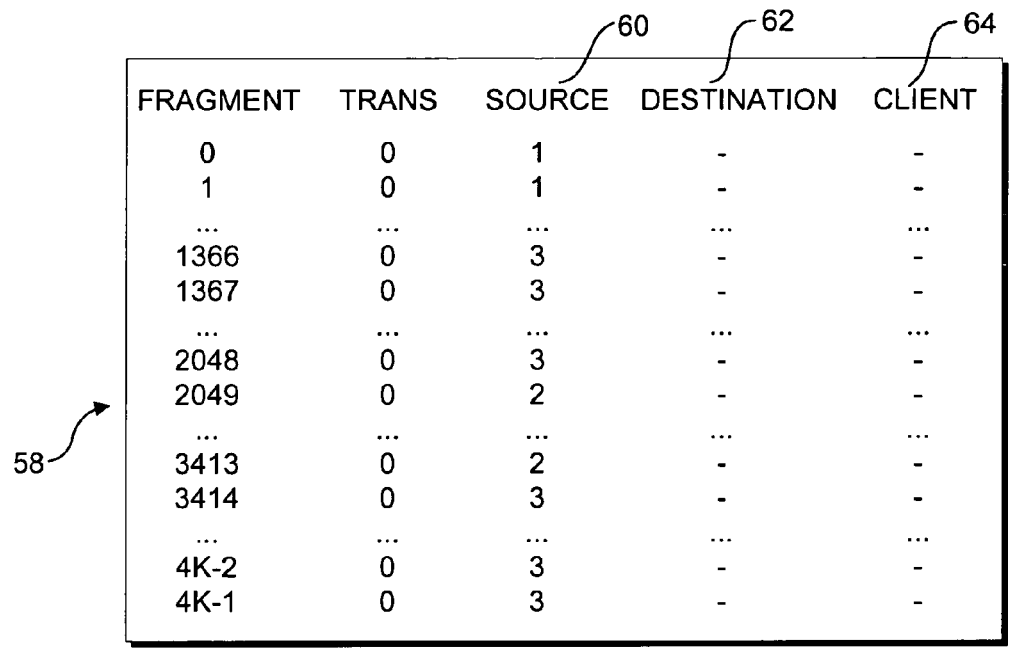

Migration operations are carried out by two closely coupled components that are part of the applicable Venus agent for the file system (i.e., WINAgent 38 for CIFS environments and UNIXAgent 50 for NFS environments). These components are the VLM and a Migration Manager (MM), which work on transitioning fragments to ensure that the fragments are safely moved while the underlying files are not in use by clients. As shown in FIGS. 8A–C, which respectively depict a fragment map 58 before, during, and after a migration, each transitioning fragment has a source filer 60, a destination filer 62, and a client 64 corresponding to the client that is controlling the migration. The Migration Manager's job is to move the files in its assigned fragments from source filer 60 to destination filer 62. The VLM's job is to make sure the migration is undetectable to applications running on the clients.

The VLM introduces centralized lock management on a per-fragment basis. To minimize this traffic, it is important that only a small fraction of the fragments are in transition at any given time. Note, however, that there is no single centralized client responsible for performing all lock management. Lock management can be distributed amongst multiple clients. Multiple clients may be concurrently operating as VLMs for distinct subsets of transitioning fragments. This ensures that no single client becomes a bottleneck for lock management.

The VLM lock protocol in necessary for two reasons. Firstly, it prevents the Migration Manager from touching files that are in active use, and secondly it allows a client to steal a file lock from the Migration Manager whenever they want it. The first reason is crucial for NFS users, who do not normally acquire locks from the server. The second is crucial for CIFS MMs, since they must release any CIFS locks they hold.

The VLM issues lock tokens upon request. There are two kinds of tokens: client tokens and MM tokens. Client tokens are always granted upon request, while MM token requests may be rejected. Client tokens include a MAXDURATION constant, indicating how long a token may last, while MM tokens can be "stolen" back.

CIFS file systems provide a rich set of locks, including read, optimistic read/write, and exclusive write locks. NFS clients do not have such locks. Having no locks is an advantage for NFS MMs, since the MM's read operation when copying a file from source to destination filer can go unnoticed by other clients. If the MM runs on a CIFS client, however, this is not possible. The MM will have to readlock the file to read it, which the CIFS clients will be able to detect when they attempt to exclusively lock the file. Furthermore, MMs will have to acquire exclusive access to the file to delete it.

In order to make locks invisible to CIFS clients, the present invention allows a lock given to a MM to be stolen back by a client requesting an access token. When a file has its lock stolen back, the MM stops the migration of that file and stops using it, thus releasing any locks it had on the file. The client is now able to access the file without interruption from the MM.

It is important to note that locks may be stolen by both CIFS and NFS clients. The reason for this is to ensure that the migration process is completely transparent to the client. If a client wants to access a file that is currently being migrated, the MM will stop such migration immediately and give up its lock. When a lock is stolen from the MM, the MM puts the file in a "go-back" queue that includes identities of files to be migrated at a later time when the corresponding client tokens expire, further details of which are discussed below.

Suppose that an initial configuration includes two filers, labeled 1 and 2 in source column 60 in fragment map 58 of FIGS. 8A–C. An operator of the system adds a third filer (labeled 3) to the configuration to increase storage capacity. Rather than just put new files on filer 3 as they are created, it is preferable to load-balance all of the file storage resources in a system, e.g., filers 1–3 in the present example. In accord with the invention, this comprises migrating fragments from each of filers 1 and 2 to filer 3.

As discussed above, the fragment identification portion of each UID comprises the first three hex characters. In the example in FIGS. 8A–C, the number of fragments is set to 4096. Accordingly, each VVV may be partitioned into a maximum of 4096 fragments. Preferably, the directories will be assigned to fragments at random, although other fragment-to-directory allocation schemes may be used as well. The assignments of fragments to partitions (and thus to filers) will be substantially balanced, but need not be sequential. FIG. 8A shows an initial configuration condition where the first half of the fragments is on filer 1, and the second half is on filer 2. Load-balancing migration will consist of moving approximately one third of the file data on filer 1 to filer 3, and one third of the file data on filer 2 to filer 3. FIGS. 8A–C illustrate this by moving the last one-third of the fragments on each of filers 1 and 2 to filer 3.

Although all of these fragments need to be moved, it is preferable that only a small number will be transitioning at any one time. Suppose that fragments 1366–1370 are moved first. When fragments are transitioning, their destination filer is set, and the corresponding transitioning value 66 is changed from a 0 (Boolean FALSE) to a 1 (Boolean TRUE), as shown in FIG. 8B.

It is noted that in the foregoing example, the maximum number of fragments was set to 4096 and the fragments are specified by a 3 hex digit value. These are for illustrative purposes only; other values for the maximum number of fragments may be used, as well as other fragment specification schemes, as will be recognized by those skilled in the art.

Figure 9:
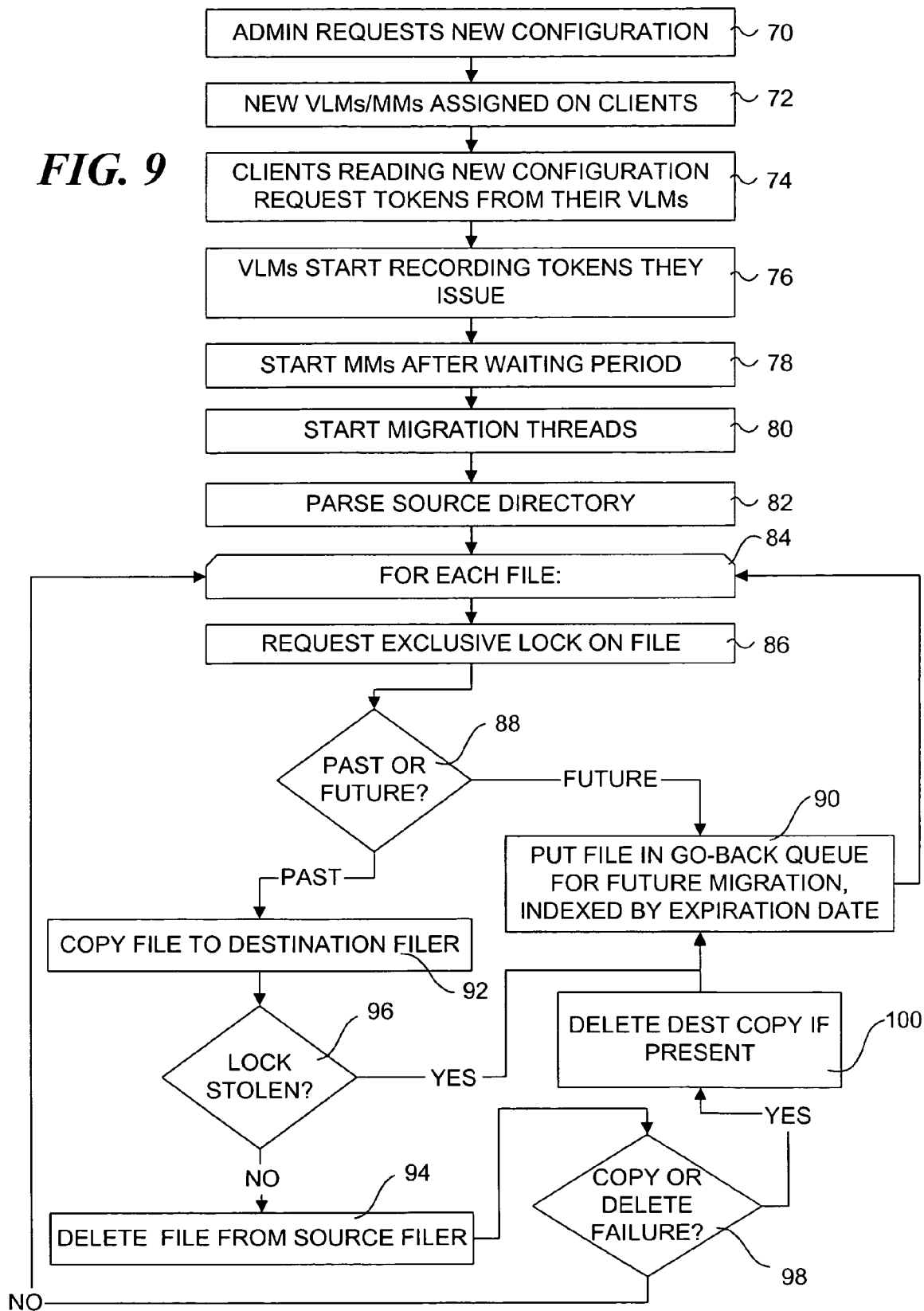
FIG. 9 is a flowchart illustrating the logic used by the invention when migrating files.

A diagram illustrating the logic used in performing a migration is shown in FIG. 9. The process starts in a block 70 in which a new configuration is requested by administration tool 52. Prior to this, one or more file storage resources will be added to the system, with the new configuration information being entered into administration tool 52. In response, new VLMs and MMs are assigned to respective clients, as provided by a block 72. Next, in a block 74, clients reading the new configuration request tokens from their respective VLMs. In a block 76, each VLM starts recording tokens it issues. After an appropriate waiting period, the MMs are started in a block 78.

In a block 80 the migration starts threads responsible for some set of fragments to be moved on a single filer. While a Migration Manager may service multiple sources, each migration thread should only service a a single source. Each thread parses its corresponding source slave directory tree, as provided by a block 82, to identify the files in the fragments to be migrated. Under the NFS file system, this requires UNIX-Agent 50 to access the source filer's file system directly in UNIX, while for CIFS file systems the physical volume name is used as a prefix when identifying the appropriate files.

Next, in accord with a start loop block 84, for each file in a migrating fragment, a request for an exclusive lock on the file is made by the MM in a block 86. A decision block 88 then determines whether the expiration time corresponding to any client tokens for the file that are returned by the VLM is in the past or the future. If the expiration time is in the future, indicating that the file has been requested for use by a client application, the logic proceeds to a block 90 in which the file is put into a go-back queue so that it may be retried at a later point in time. Further details of the go-back queue are discussed below. The logic then returns to start loop block 84 to begin processing the next file in the fragment.

If the expiration time returned is in the past, indicating that there are no tokens that are presently active for the file (i.e., no application on any of the clients is presently using the file), the file is then copied to the destination filer in a block 92 and deleted on the source filer in a block 94. During these actions, the VLM listens for any client requests to steal the lock back, as indicated by a "lock stolen?" determination made in a decision block 96. Also, in a decision block 98 a determination is made to whether either the copy or delete action failed due to a CIFS lock on the file preventing such actions from being performed. If both no request to steal the lock occurs and the file is successfully copied to the destination filer and deleted from the source filer, the logic loops back to start loop block 84 to begin processing the next file in the migrating fragment. However, if either a request to steal the lock occurs or there is a problem during the copy or delete operation, the logic proceeds to a block 100 in which the copy on the destination, if present, is deleted, and the file is put in the go-back queue in accord with block 86.

Each Migration Manager maintains a go-back queue containing the identification of files that were skipped, preempted from being migrated, or had a failure occur during migration. If there was a failure during the copy or delete operation, the file is placed on the queue with a wake-up time of a predetermined polling period. If the file was skipped because a token was in use, the VLM will return the time the file will be accessible again (i.e. the expiration time of the token). Another attempt at migrating the file will then be performed at this point. If the file was preempted, it is set to wake-up at a period of one MAXDURATION from the current time.

When the Migration Manager completes its work, it changes the configuration data for each VVV on each filer, to indicate the fragment(s) is (are) no longer transitioning, and the MM/VLM is no longer serving the fragment(s). In addition, the VLM drops all tables and stops recording tokens. Eventually, each of the clients will be forwarded the new configuration information and stop asking its corresponding VLM for tokens.

As discussed above, when a directory is very large to begin with or becomes very large, it is desirable to split the directory. In this instance, the files in the split directory are migrated to new directories using a "mini-migration" process. In short, the mini-migration process is substantially similar to a normal migration process, except that certain additional information needs to be accounted for.

For mini-migration, there needs to be an entry in the configuration information, a transitioning state, VLM locking, checking of both the source and destination, and a Migration Manager. Only one directory should be mini-migrated at a time. New UIDs must be selected in fragments that reside on different filers from the existing ones. The following information is appended to the configuration information while a mini-migration is in progress: the former fanout (i.e. number of splits) of the directory, the IP address of the Migration Manager, the source sequence of UIDs, and the destination sequence of UIDs. In addition, mini-migration must wait one full configuration expiration period before moving any files.

Exemplary Computer System for use as Client Machines in System

Figure 10:
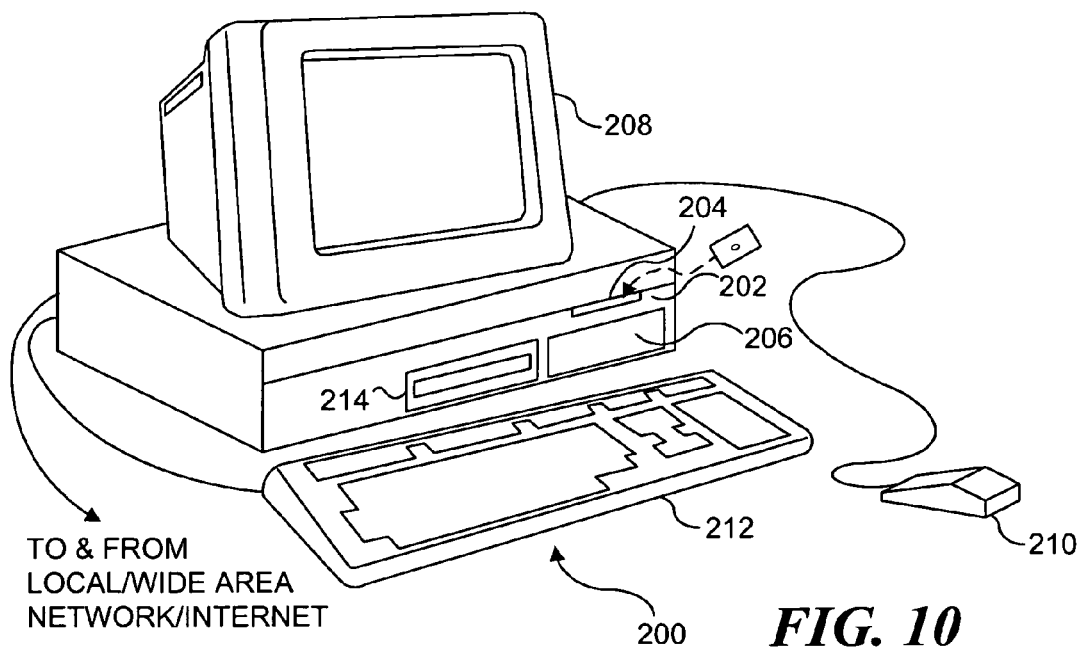
FIG. 10 is a schematic diagram of an exemplary computer that may be implemented in the present invention.

With reference to FIG. 10, a generally conventional computer 200 is illustrated, which is suitable for use in connection with practicing the present invention, and may be used for the various clients in the system, as well as for running Administration tool 52. Examples of computers that may be suitable for clients as discussed above include PC-class systems operating the Windows NT or Windows 2000 operating systems, Sun workstations operating the UNIX-based Solaris operating system, and various computer architectures that implement LINUX operating systems. Computer 200 is also intended to encompass various server architectures as well. Alternatively, other similar types of computers may be used, including computers with multiple processors.

Computer 200 includes a processor chassis 202 in which are mounted a floppy disk drive 204, a hard drive 206, a motherboard populated with appropriate integrated circuits (not shown) including memory and one or more processors, and a power supply (also not shown), as are generally well known to those of ordinary skill in the art. It will be understood that hard drive 206 may comprise a single unit, or multiple hard drives, and may optionally reside outside of computer server 200. A monitor 208 is included for displaying graphics and text generated by software programs and program modules that are run by the computer server. A mouse 210 (or other pointing device) may be connected to a serial port (or to a bus port or USB port) on the rear of processor chassis 202, and signals from mouse 210 are conveyed to the motherboard to control a cursor on the display and to select text, menu options, and graphic components displayed on monitor 208 by software programs and modules executing on the computer. In addition, a keyboard 212 is coupled to the motherboard for user entry of text and commands that affect the running of software programs executing on the computer. Computer 200 also includes a network interface card (not shown) for connecting the computer to a computer network, such as a local area network, wide area network, or the Internet.

Computer 200 may also optionally include a compact disk-read only memory (CD-ROM) drive 214 into which a CD-ROM disk may be inserted so that executable files and data on the disk can be read for transfer into the memory and/or into storage on hard drive 206 of computer 200. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for incrementally scaling a file system, comprising:
   adding a new file storage device to a file system having a storage space comprising at least one other file storage device having a plurality of directories and files stored thereon to form a new file system configuration; and
   migrating a portion of the files from said at least one other file storage device to the new file storage device while hiding such migration from client applications that access files from the file system so as to not affect file access operations requested and performed by the client applications during the migration;
   wherein the storage space of the file system is partitioned into fragments; the files in the file system are assigned to corresponding fragments; and files are assigned to corresponding fragments based on the directories the files are in.

2. The method of claim 1, wherein the portion of files that are migrated from said at least one storage device to the new storage device is selected such that the files are distributed across all of the storage devices in the file system after the migration is completed based on a relative capacity of each of the storage devices in the system.

3. The method of claim 1, wherein the file storage devices are accessed using a file system protocol, further comprising providing a storage abstraction layer between the client applications and the file system protocol, said storage abstraction layer providing an interface to the client applications that presents the file system as a virtual file system.

4. The method of claim 3, further comprising providing information corresponding to the new file system configuration to the storage abstraction layer.

5. The method of claim 3, wherein the storage abstraction layer distributes new files created by the client applications across all of the storage devices in the file system so as to load balance access operations of the files.

6. The method of claim 3, further comprising:
filtering requests made by client applications to access a file stored on the file system, said requests referencing a virtual storage location of the file; and
remapping the file access requests that are filtered from the virtual storage location to a physical location on a storage device on which the file is actually stored; and
accessing the file through use of the file system protocol by referencing the physical location of the file.

7. The method of claim 1, wherein migrating the files to the new storage device comprises:
identifying a source location corresponding to a storage device and directory in which each file is initially stored;
identifying a destination location for each file corresponding to a directory on the new storage device the file is to be stored in;
copying each file from the source location to the destination location;
deleting each file from its source location;
monitoring for any file access requests made by an client application while the file is being migrated; and
aborting the migration of the file if a file access request is made during the migration of the file.

8. The method of claim 7, further comprising putting any file whose migration is aborted into a queue such that the migration of such file may be retried at a future time.

9. The method of claim 7, further comprising:
providing a lock on each file during its migration; and
allowing the lock to be stolen by a client application if the client application requests access to the file during its migration.

10. The method of claim 7, further comprising:
providing a lock token for each file opened by a client application, said token identifying that its corresponding file is currently in use and not available to be migrated.

11. The method of claim 7, when each token is assigned an expiration time after which the token is no longer valid.

12. The method of claim 11, further comprising:
putting a file having an unexpired token into a queue such that the migration for such file may be retried at a future time; and
migrating the file after the token has expired.

13. The method of claim 1, wherein the directories are assigned to corresponding fragments in a random manner.

14. The method of claim 1, further comprising selecting (a) set(s) of fragments to be migrated when a new storage device is added to the system.

15. The method of claim 14, wherein the set(s) of fragments that are selected comprise a portion of a total number of directories on all of the storage devices in the file system such that after the set of fragments are migrated, each storage device has a proportionate amount of directories based upon its relative capacity.

16. The method of claim 1, further comprising:
providing an administrative tool that enables a user to add a new storage device to the configuration of the file system; and
automatically selecting the portion of files to be migrated to the new storage device based on the new configuration.

17. The method of claim 1, wherein the file system comprises a virtual volume corresponding to storage space provided by at least one storage device, said virtual volume including a plurality of virtual directories in which virtual files may be stored and having configuration data stored on the file system that maps virtual directories to physical directories.

18. The method of claim 17, wherein the configuration information comprises a master directory stored on a storage device, said master directory including a plurality of subdirectories, each corresponding to a respective virtual directory and having an encoded pointer that points to a location on the file system where files corresponding to the virtual directory are physically stored.

19. The method of claim 18, wherein the configuration information further comprises a fragment map that identifies what storage device a directory and its files are stored on based upon the fragment(s) the directory is assigned to.

20. A method for load balancing file access on a network file system having a storage space provided by a plurality of network storage devices in which a plurality of files are stored, comprising:
partitioning the storage space into a plurality of fragments, each fragment being mapped to one of said plurality of network storage devices;
assigning files among said plurality of files to fragments such that each fragment, on average, comprises a substantially equal number of files;
migrating files among said plurality of files from network storage devices on which they are initially stored to other network storage devices corresponding to the fragment they are assigned to in a manner such that the migration of files are undetectable to client applications that access the network file system;
wherein each file is assigned to its corresponding fragment based upon the directory the file resides in.

21. The method of claim 20, further comprising assigning new files that are created by the client applications to fragments on a random basis.

22. The method of claim 20, further comprising splitting directories into a plurality of portions, wherein each directory portion of files is assigned to a respective fragment.

23. The method of claim 20, further comprising providing a storage abstraction layer that enables the client applications to access the network file system as a virtual storage space including at least one virtual volume comprising a plurality of virtual directories and file names.

24. The method of claim 23, further comprising providing the storage abstraction layer with access to a fragment map that maps each fragment to a storage device to which the fragment is hosted.

25. The method of claim 24, wherein each virtual directory has a corresponding physical directory on one of said plurality of network storage devices, and wherein each virtual volume includes data stored on a network storage device that links each virtual directory to its corresponding physical directory.

26. The method of claim 25, wherein the data that links the virtual and physical directories comprises a master directory that includes a plurality of subdirectories stored on a network storage device, each subdirectory being named based on a corresponding virtual directory name and including at least one file having a name comprising indicia that identifies the location of the physical directory on the network file system corresponding to the virtual directory.

27. The method of claim 26, wherein said indicia pointer comprises a first portion that identifies the fragment the files are assigned to and a second portion identifying a name of the physical directory in which the files are stored.

* * * * *